United States Patent

[11] 3,579,209

[72] Inventors Thomas J. Gilligan
Palos Verdes Pennisula;
Arthur T. Nozaki, Torrance, Calif.
[21] Appl. No. 758,076
[22] Filed Sept. 6, 1968
[45] Patented May 18, 1971
[73] Assignee Electronic Memories, Incorporated
Hawthorne, Calif.

[54] HIGH SPEED CORE MEMORY SYSTEM
17 Claims, 4 Drawing Figs.

[52] U.S. Cl. .......... 340/174
[51] Int. Cl. .......... G11c 5/02, G11c 11/06
[50] Field of Search .......... 340/174 (M)

[56] References Cited

UNITED STATES PATENTS

| | | | |
|---|---|---|---|
| 3,072,892 | 1/1963 | Kluck | 340/174 |
| 3,110,888 | 11/1963 | Kluck | 340/174 |
| 3,436,750 | 4/1969 | Bakker | 340/174 |
| 3,439,352 | 4/1969 | Fischer | 340/174 |
| 3,492,664 | 1/1970 | Klett | 340/174 |

*Primary Examiner*—James W. Moffitt
*Attorney*—Lindenberg and Freilich

ABSTRACT: A magnetic core memory system is disclosed comprising a rectangular array of magnetic cores. A first plurality of independent wires thread cores along one axis and a second plurality of dependent wires thread cores along the other axis for coincident-current selection of cores to be switched. The second plurality of wires are current dependent in that the current through a selected wire is returned in the opposite direction through unselected wires in parallel. In that manner, a selected core may be overdriven with more than half-select current $I_h$ in one of the first plurality of wires and half-select current $I_h$ in one of the second plurality of wires. The unselected cores threaded by the overdriven wire receive a net current of $I_h$ due to return current through unselected ones of the second plurality of wires.

INVENTOR.
THOMAS J. GILLIGAN
ARTHUR T. NOZAKI
BY Lindenberg & Freilich
ATTORNEY

INVENTOR.
THOMAS J. GILLIGAN
ARTHUR T. NOZAKI

BY Lindenberg & Freilich
ATTORNEY

HIGH SPEED CORE MEMORY SYSTEM

BACKGROUND OF THE INVENTION

1. Field of the Invention

This invention relates to magnetic core memories and more particularly to a core memory drive system.

2. Description of the Prior Art

Magnetic core memory systems have been provided with many arrangements for selectively driving half-select current $I_h$ through each of two windings of a core to be switched. In the conventional four-wire coincident current memory, such an arrangement is provided for both the read and the write cycle. In other more recent memories, such an arrangement is provided for the read cycle only. But in any arrangement, a limitation on the speed of the memory system is the time $t_s$ required to switch a core.

The switching speed of a ferrite core may be characterized by the following relationship:

$$1/t_s = kT_s \frac{(NI - NI_0)}{D}$$

where $k$ is a proportionality constant; $T_s$ is a switching time constant; D is the mean diameter of the core; NI is the net drive current through $n$ windings which produces a magnetic force (mmf) sufficient to set the core in a given state, and for single-turn windings is in the usual case equal to $2I_h$; and $NI_0$ is the net drive current equivalent to the mmf at the knee of the B-H hysteresis loop for the core. Since the switching time constant $T_s$, the mean diameter D, and the B-H hysteresis loop are parameters fixed by the core manufacturer, the only parameter which may be varied in designing a memory system with a given core is the drive current NI. In most coincident current core memory applications, the drive current NI is constrained to be approximately 1.3 $NI_0$ although it is generally recognized that a core will switch faster if over driven more. This is due in part to the B-H hysteresis loop of the core not being perfectly rectangular. If an ideal core could be provided with a perfectly rectangular hysteresis loop, the drive current could then be increased to, say 1.9 $NI_0$, without disturbing unselected cores because the half-select current $I_h$ equal to 0.5 NI in a winding of an unselected core would still be only 0.95 $NI_0$ which would be insufficient to disturb such an ideal core.

Disturbance of an unselected, realistic core should be minimized because when reading a core in a disturbed 1-state the output signal obtained is less than when reading a core in a nondisturbed 1-state, and when reading a core in a disturbed 0-state, an unwanted output signal is sensed. Various patterns for the sense windings have been devised to cancel some of the noise produced by disturbed cores, but all noise will not always be cancelled. For example, in the most widely used diagonal pattern, the polarity of the voltage induced by alternate cores in the 1-state will be in opposite directions, and will therefore cancel, but only if all cores of a given row are disturbed in the same direction. Thus, the sense pattern selected for cancelling noise will not operate to equal advantage for all combinations of states that can exist in a core memory.

OBJECTS AND SUMMARY OF THE INVENTION

A primary object of the present invention is to provide an arrangement for over driving selected cores of an array in a memory system without increasing the half-select drive current of unselected cores of the array, except possibly when writing a zero into a core which has just been previously read.

Briefly, in accordance with the present invention, a rectangular array of magnetic cores is provided with a first plurality of independent wires threading cores along one axis and a second plurality of wires threading cores along the other axis. First switching means for driving current in a selected wire along the one axis is provided with current in given direction therethrough in excess of half the current necessary to switch the associated cores to a given state representing a binary 1. Second switching means is then provided for driving current in a selected wire along the other axis in a direction through one core associated therewith that is the same direction as the current provided by the first switching means, and of a magnitude sufficient to switch (with overdrive) the one core to a given state when combined with the current provided by the first switching means. Current provided by the first switching means through the selected wire along the one axis is returned to the power supply without passing through other wires, but current provided by the second switching means through the wire along the other axis is returned to the power supply through the other wires of the array along the same axis. That is accomplished by connecting together all of the wires of the array at the far end remote from the second switching means such that the return current is divided equally by the unselected wires.

In one embodiment, the rectangular array includes four cores along the one axis and any number of cores along the other axis. Additional arrays are disposed along the one axis with wires thereof along that axis selected simultaneously with corresponding wires of the other arrays in order that cores in all arrays may be selected in common by the first switching means. Each array is provided with its own second switching means in order that a unique core in each array may be selected for switching from among all of those selected by the first switching means.

As is the common practice, a selected core is first read by setting it to the zero state (binary 0) before a binary digit is stored therein. That is done by reversing the polarity of the currents provided by the first and second switching means. If the digit to be stored thereafter is a binary 0, the current normally provided by the second switching means is inhibited, and a third means connected to the node at the far side of the array is turned on instead to provide a current through each wire connected to the node of the same amplitude and polarity as would otherwise be returned through the unselected wires, thereby providing a current of the same amplitude and polarity through the winding of the selected core as through the windings of the unselected cores.

In a second embodiment, the rectangular array includes two cores along the one axis, instead of four, in order to increase to a maximum the over-drive feature provided by the present invention for a selected core. Whereas in the first embodiment each unselected wire along the other axis is terminated in its characteristic impedance (at the end thereof remote from the node common to all), in this embodiment there is no impedance to ground. Instead, the ends of the two windings remote from the node are coupled together by an impedance twice the characteristic impedance of either wire. A diode switch connected to the terminated ends of both wires provides a current path for reverse (write-0) current to be transmitted through both wires while storing a binary 0. The write-0 current is preferably provided by a driver connected to the diodes. The node between the two wires at the far end of the array is connected to ground through an impedance equal to half the characteristic impedance of one of the windings, i.e., the characteristic impedance of both wires in parallel. A diode in parallel with that impedance is poled for conduction while write-0 current is being driven through both wires.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2:
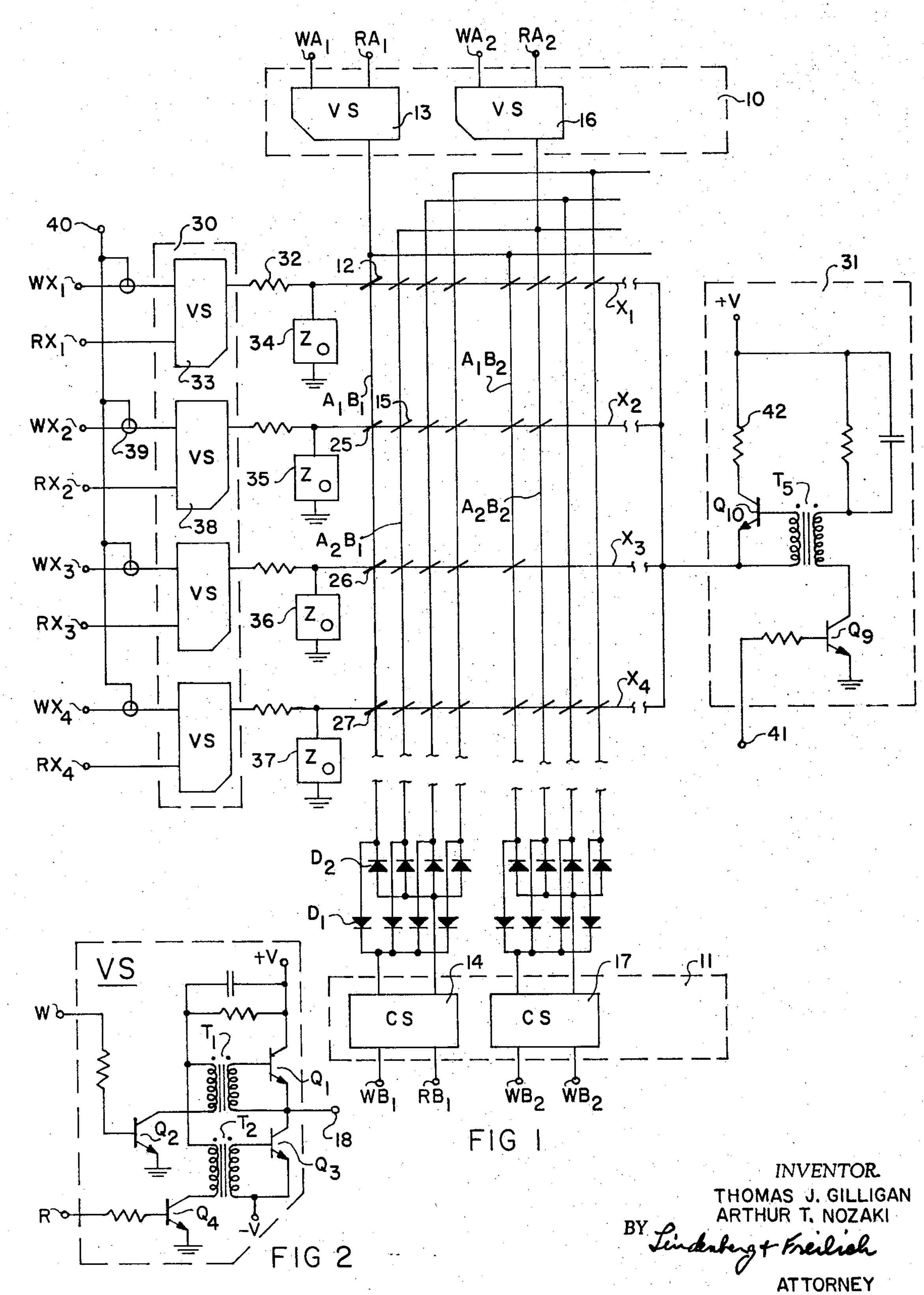
FIG. 1 illustrates a schematic diagram of a first embodiment of the present invention.
FIG. 2 illustrates a circuit diagram of a voltage switch employed in the present invention.

Although particular switching circuits are illustrated for selectively driving currents through magnetic core windings, it should be understood that other circuits may be used to equal advantage to over drive a selected core without at the same time increasing the disturbance of unselected cores. As noted hereinbefore, the switching speed of a ferrite core is a function of the drive current NI which may be varied in the system designer, and is directly proportional to the difference NI—$NI_0$, wherein $NI_0$ is the net drive current required to produce the magnetomotive force at the knee of the B-H hysteresis loop for the core. However, for design purposes, the switching time should be characterized at a drive current which is 10 percent decreased from that being employed in order to allow for any variations in the power supply and other parameters set by the core manufacturer, including the B-H hysteresis loop of the individual cores. Accordingly, speed may be considered to be directly proportional to the difference 0.9 NI—$NI_0$, where $NI_0$ is a nominal value equal to 75 percent of the drive current NI normally employed in conventional coincident core memories. From the following table it may be seen that the switching speed factor of a given core may be increased almost 100 percent by increasing the drive current NI only 15 percent, and maybe increased 400 percent by increasing the drive current NI only 50 percent.

| DRIVE CURRENT NI | SWITCHING SPEED FACTOR (0.9 NI—$NI_0$) |
|---|---|
| 1.0 | 0.15 NI |
| 1.1 | 0.24 NI |
| 1.2 | 0.33 NI |
| 1.3 | 0.42 NI |
| 1.4 | 0.51 NI |
| 1.5 | 0.60 NI |

In computing the factor 0.9 NI—$NI_0$ in terms of the drive current NI for the foregoing table, the nominal value of $NI_0$ equal to 0.75 NI has been substituted.

Referring now to FIG. 1, as a first embodiment of the invention is illustrated as comprising a rectangular array having four cores disposed along the vertical axis and any number of cores disposed along the horizontal axis. Each core of a given column is threaded by a wire to produce a single turn winding. Considering the wires for only the first four columns counting from the left, since the pattern is repeated for all of the columns in groups of four, any given wire may be selectively energized to conduct current in one direction to write a binary digit in a core threaded thereby, and in the opposite direction to read a binary digit previously stored, by actuating one of a plurality of voltage switches in a bank 10 and one of a plurality of current switches in a bank 11. For example, to write a binary digit in a core 12 a wire $A_1B_1$ is selectively energized by a voltage switch 13 and a current switch 14. If the operation is to write a binary digit in the core 12, the voltage switch 13 is actuated through an input terminal $WA_1$ while the current switch 14 is actuated through a terminal $WB_1$ the manner in which those terminals are selected from the combined information of a memory address word and operation code is well known to those skilled in the art and therefore need not be described herein.

The direction of the current for such an operation is arbitrarily selected to be from the voltage switch 13 to the current switch 14. If the operation is to read a binary digit in the core 12, the switches 13 and 14 are actuated through respective input terminals $RA_1$ and $RB_1$ to reverse the direction of the current through the wire $A_1B_1$. A core in any other column may be similarly selected for a read or write operation. For instance, to select a core 15 in the second column, a voltage switch 16 is actuated together with the current switch 14.

Diodes connect each wire of a group of four to each of two terminals of a current switch, all of the diodes coupling wire to one terminal being poled for current in one direction and all of the diodes coupling the wire to the other terminal being poled in the other direction. For example, the wire $A_1B_1$ is coupled to one output terminal of the current switch 14 by a diode $D_1$ and to the other output terminal of the same switch by a diode $D_2$. If the operation is to read, only the diode $D_2$ is forward biased for conduction from the current switch 14 to the voltage switch 13. Similarly, when the operation is to be performed is to write a binary digit into a core threaded by the wire $A_1B_1$, only the diode $D_1$ is forward biased. All of the other diodes connecting wires to output terminals of the current switch 14 and similar diodes connecting wires to other current switches of the bank 11, such as a current switch 17, prevent any current from flowing through unselected wires via a tortuous path such as, during a read operation, up the wire $A_2B_1$, down the wire $A_2B_2$, and up the wire $A_1B_2$ to the voltage switch 13.

FIG. 2 illustrates a diagram of a circuit which may be employed for the switches in the bank 10. It includes a first transistor $Q_1$ which is switched on by a pulse at an input terminal W via a second transistor $Q_2$ and a transformer $T_1$ to connect an output terminal 18 to a collector voltage source +V. It should be understood that the signal applied at the input terminal W is derived from a decoder and includes not only the information that the operation is to write a binary digit, as noted hereinbefore, but also a timing signal as is well known to those skilled in the art. A third transistor $Q_3$ is switched on by a pulse at an input terminal R via a fourth transistor $Q_4$ and a second transformer $T_2$ to connect the output terminal 18 to a source of emitter voltage −V. The pulse at the input terminal R is developed in the same manner as the pulse at the input terminal W, but only for a read operation. In that manner, the voltage switch functions to connect the output terminal 18 to a positive supply voltage when actuated for a write operation and to a negative supply voltage when actuated for a read operation.

Figures 3, 4:
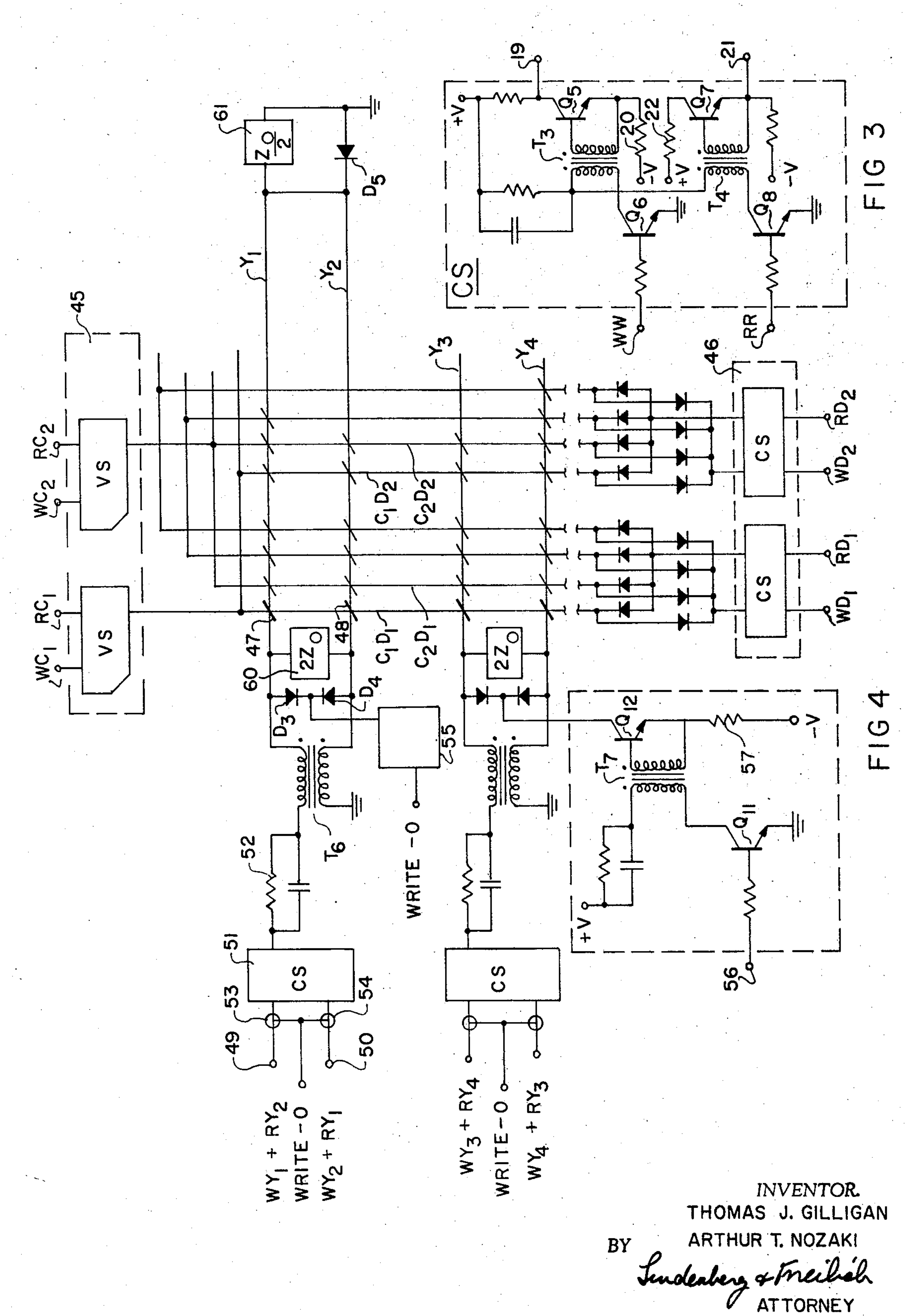
FIG. 3 illustrates a circuit diagram of a current switch employed in the present invention.
FIG. 4 illustrates a schematic diagram of a second embodiment of the present invention.

FIG. 3 illustrates a circuit diagram for the current switch employed in the bank 11. It includes a transistor $Q_5$ switched on by a pulse at an input terminal WW via a transistor $Q_6$ and a transformer $T_3$ for a write operation to connect an output terminal 19 to a write current source comprising a resistor 20 and a negative supply voltage −V. For a read operation, a transistor $Q_7$ is similarly turned on in response to a pulse at an input terminal RR via a transistor $Q_8$ and a transformer $T_4$ to connect an output terminal 21 to a read current source comprising a resistor 22 and a positive supply voltage +V. Thus, it may be seen that all of the coupling diodes connecting to the output terminal 19 of a given current switch, such as the coupling diode $D_1$ (FIG. 1), are reversed biased except during a write operation. Similarly, all of the diodes connected to the output terminal 21, such as the diode $D_2$ (FIG. 1), are reverse biased except during a read operation.

The resistors 20 and 22 are selected to provide write and read currents respectively of an amplitude equal to four-thirds of the usual half-select current (4/3 $I_h$) or two-thirds of the nominal drive current (2/3 NI) equal to approximately 0.87 $NI_0$ where $NI_0$ is the net drive current equivalent to the mmf at the knee of the B-H hysteresis loop for the core. The normal half-select current $I_h$ for the selected core is then provided by one of four interrelated wires $X_1$ through $X_4$ of the rectangular array. Thus, with current in the selected horizontal wire equal to $I_h$ and current through the selected vertical wire equal to 4/3 $I_h$ the net drive current is equal to 7/3 $I_h$ which is equal to 1.17 NI, more than is required to switch the selected core from the 0 to the 1 state. In that manner, the drive current NI is increased 17 percent from its nominal value to increase the switching speed by 100 percent. For example, to switch the core 12 from a 0 to a 1 state, the current from the voltage switch 13 to the current switch 14 is 4/3 $I_h$ while half-select current $I_h$ is transmitted over the wire $X_1$ in the same direction through the core 12 as the current from the voltage switch 13 to the current switch 14. To avoid disturbing the unselected cores 25, 26 and 27 in the same column, it necessary to reduce the net drive current through each from 4/3 $I_h$ to $I_h$. That is accomplished in accordance with the present invention by returning the selected winding current $I_h$ through the unselected wires in parallel such that a current is provided in the unselected cores by horizontal wires in a direction opposite to the current provided by a horizontal wire through the selected core but one-third the amplitude. Thus, assuming the currents are from top to bottom and left to right for the write operation the following conditions hold:

| | Write 1 | Write 0 |
|---|---|---|
| Selected Core | $I_h$+4/3 $I_h$=1.17 NI | $I_h$ |
| Unselected Core | $I_h$ | $I_h$ |

The manner is which the foregoing conditions are satisfied will now be described with reference to a bank of voltage switches 30 and a write-0 control switch 31. Each of the voltage switches is the same as the switch shown in the circuit diagram of FIG. 2. A resistor coupling each voltage switch of the bank 30 to a horizontal wire, such as a resistor 32 coupling the voltage switch 33 to the wire, $X_1$, is selected to provide a write current equal to 4/3 $I_h$, and a read current of equal amplitude but opposite polarity.

The current provided by a selected voltage switch and its coupling resistor to a selected wire is reduced from 4/3 $I_h$ to $I_h$ in the selected winding by a plurality of impedances 34, 35, 36 and 37 connecting the near side of the respective horizontal wires $X_1$, $X_2$, $X_3$ and $X_4$ to ground. All of these impedances are equal in value and since the write-0 switch 31 is turned off during a read or a write-1 operation the value selected is the value of the characteristic impedance $Z_0$ of a single horizontal wire. The advantage of using the characteristic impedance of a wire to terminate it is that it keeps the wire free of standing waves which might otherwise appear during a read or write operation.

Assuming a write-1 operation in the core 12, the 4/3 $I_h$ current provided by a resistor 32 and the voltage switch 33 is reduced to $I_h$ in the wire $X_1$ since each of the impedances 34, 35, 36 and 37 will conduct one-fourth of the current 4/3 $I_h$. This is so because the four impedances are connected virtually in parallel. Thus, the impedance 34 shunts to ground a current equal to 1/3 $I_h$ leaving a current of $I_h$ flowing through the selected wire $X_1$ to the common junction at the far end. The return path for the current through the wire $X_1$ is through the remaining wires $X_2$, $X_3$ and $X_4$. Since the impedance of each return path is the same as the others, the return current divides equally to provide an opposing current of 1/3 $I_h$ through the unselected cores 25, 26 and 27. Thus, the net drive current through each of the unselected cores is $I_h$ while the drive current of the selected core is 7/3 $I_h$ instead of 2 $I_h$ as in the conventional coincident current core memories, an increase in drive current of 17 percent and an increase in the switching speed of the selected core of 100 percent over the conventional coincident current core switching operation.

To read a selected core, such as the core 12, the directions of the currents are reversed to switch the core from the 1-state to the 0-state. That is accomplished by applying read control signals to the banks of switches 10, 11 and 30. For instance, to selectively read the core 12, input terminals RAand $RB_1$ are energized to cause a current of 4/3 $I_h$ value to be conducted from the current switch 14 to the voltage switch 13 while an input terminal $RX_1$ is energized to cause a current of $I_h$ to flow from the impedances 35, 36 and 37 in parallel to the wire $X_1$. At the resistor 32 a current of 1/3 $I_h$ is added through the impedance 34 to provide a total current through the resistor 32 having a value of −4/3 $I_h$.

To write a binary 0, it is necessary to inhibit all of the cores in a selected column from being switched since, as noted hereinbefore, the normal operation contemplated for the array is the conventional read-write cycle which requires all addressed cores to first be set to the 0-state and then selectively set to the 1-state in accordance with the data being stored. For example, to store a binary word of M digits in a memory location comprising the core 25 in the least significant digit position, the terminals $RA_1$ and $RB_1$ are first energized to provide negative current through the wire $A_1B_1$ from the current switch 14 to the voltage switch 13 of a value equal to 4/3 $I_h$. At the same time, terminal $RX_2$ is energized to provide a negative current through the wire $X_2$ having a value $I_h$ while the remaining wires $X_1$, $X_3$ and $X_4$ are each provided with positive current having a value of 1/3 $I_h$. A corresponding rectangular array for each of the other M−1 digits to be stored is provided each with the same vertical wires shown in FIG. 1. The corresponding terminal $RX_2$ of each of the remaining rectangular arrays is energized at the same time.

Following the read cycle, the binary word is stored in the addressed memory location by selectively setting to the binary-1 state the core of each rectangular array selected. For instance, if a binary 1 is to be stored in the least significant digit position, terminal $WX_2$ is energized to provide a positive current $I_h$ through the wire $X_2$ while the terminals $WA_1$ and $WB_1$ are energized to provide a positive current 4/3 $I_h$ through the wire $A_1B_1$. In that manner, the core 25 is first set to the 0-state during the read cycle and then set to the 1-state during the write cycle. However, if a binary 0 is to be stored in the least significant bit position, core 25, it would not do to have positive current driven through the wire $X_2$. Accordingly, if the operation for that bit position is a write-0 operation, switch 38 associated with the wire $X_2$ should be inhibited during the write cycle. That may be accomplished by an inhibit switch 39 coupling the terminal $WX_2$ to the voltage switch 38 in such a manner that when a control terminal 40 is energized the input terminal $WX_2$ is decoupled from the voltage switch 38. At the same time, a terminal 41 is energized to turn on a transistor $Q_9$. The output of transistor $Q_9$ turns on transistor $Q_{10}$ via a transformer $T_5$. Current then flows through a resistor 42, the transistor 10 and parallel wires $X_1$ to $X_4$ to ground through their respective terminating impedances 34 to 37. In that manner, the current through each wire $X_1$ to $X_4$ reduces the net drive current through each of the cores 12, 25, 26 and 27 from the 4/3 $I_h$ provided by the wire $A_1B_1$ to $I_h$. To accomplish that resistor 42 is selected to provide a current therethrough equal to 4/3 $I_h$. The terminals 40 and 41 may be selectively energized during a write operation as a function of the binary digit being stored in a manner well known to those skilled in the art.

It should be noted that all horizontal wires of a given rectangular array (of which only one is shown) intersected by a selected vertical winding (of which only a few are shown) must carry current during a read and a write operation. Accordingly, it should be understood that the four horizontal wires shown represent a given bit position of only four words for each vertical wire. Thus, the word capacity of a memory constructed from the core array of FIG. 1 is four times the number of vertical wires provided. Considering the four horizontal wires of each rectangular array at constituting a plane, it may be readily appreciated how a plurality of planes may be provided in a stack, one on top of the other, each plane storing one binary digit of each word in the memory. However, these bit planes may be combined for ease of manufacture in larger physical planes and therefore each plane will contain a number of bits.

A second embodiment will now be described with reference to FIG. 4 in which a first rectangular array having only two horizontal wires $Y_1$ and $Y_2$ is shown with a plurality of vertical wires. Only the drive end of a second rectangular array comprising horizontal wires $Y_3$ and $Y_4$ are shown to illustrate the manner in which a plurality of rectangular arrays may be assembled.

The vertical wires such as the wires $C_1D_1$ are selected by actuation of a selected one of a first bank of switches 45 and a selected one of a second bank of switches 46 which correspond to the respective banks of switches 10 and 11 of FIG. 1, and are identical in construction and operation except that the current switches in the bank 46 have resistors 20 and 22 (FIG. 3) selected to provide a drive current $2I_h$ equal to the net drive current NI which produces a magnetomotive force sufficient to switch the core from one state to the other depending upon the polarity of the current. Thus, the vertical wires are driven with sufficient current to switch all of the cores, such as cores 47 and 48 associated with the vertical wire $C_1D_1$. However, only the selected core is switched, such as the core 47 in response to a write-$Y_1$ control signal ($WY_1$) at a terminal 49 or a read $-Y_1$ control signal ($RY_1$) at terminal 50 of a current switch 51. Similarly, only the core 48 is switched in response to a write $-Y_2$ control signal ($WY_2$) at terminal 50 or a read $Y_2$ control signal ($RY_2$) at terminal 49.

A resistor 52 which couples the switch 51 to the wire $Y_1$ is selected to provide a drive current therethrough of a magnitude $I_h$ from left to right for a write-1 operation and from right to left for a read or write-0 operation. The return path for the current is through the wire $Y_2$. A transformer $T_6$ having its primary connected in series with the resistor 52 has its secondary coupling the wire $Y_1$ to circuit ground. In that manner, when the switch 51 is actuated to provide positive current through the wire $Y_1$ (from left to right) the near end of the wire $Y_2$ connected to the transformer $T_6$ is driven to a voltage below ground by an amount substantially equal in absolute value that the near end of the wire $Y_1$ connected to the transformer $T_6$ is above ground. For instance, assuming +20 volt pulse at the junction between the resistor 52 and the transformer $T_6$, the junction between the transformer $T_6$ and the wire $Y_1$ is at +10 volts while the junction between the transformer $T_6$ and the wire $Y_2$ is driven to −10 volts. In that manner, while the core 47 is being selectively switched to the 1-state by a net drive current of $3I_h$, the unselected core 48 is not switched because the net current through it is $I_h$. Similarly, if the core 47 is being set to the 0-state by currents in the opposite direction through the wire $C_1D_1$ and the wire $Y_1$, the unselected core 48 is not set because the net drive current through it is again $I_h$, but in the opposite direction. For any pair of cores in the rectangular array the following conditions will hold:

| | Write 1 | Write 0 |
|---|---|---|
| Selected Core | $2I_h+I_h=1.5$ NI | $2I_h-aaI_h$ |
| Unselected Core | $I_h$ | $I_h$ |

These conditions hold because the full half-select current $I_h$ in a horizontal core is provided as return current in the opposite direction through the other horizontal wire. Consequently, the unselected cores are not disturbed and the selected core is over-driven by 50 percent for an increase in switching speed of 400 percent.

As in the first embodiment of FIG. 1, for a write-0 operation it is necessary that negative current (right to left) be provided through both wires connected to a common junction at the far end. That is accomplished by inhibiting both sides of the switch 51 in response to a write-0 control signal applied to a switch 55. Actuation of the write-0 switch 55 forward biases diodes $D_3$ and $D_4$ to draw a negative current through both wires $Y_1$ and $Y_2$ via a diode $D_5$ having its anode connected to ground. A zero may also be written by not inhibiting switch 51 and simply turning on switch 55 with $2I_h$. This may allow better control of bit currents.

A circuit diagram of the write-0 switch 55 is shown in connection with the second rectangular array comprising wires $Y_3$ and $Y_4$. A transistor $Q_{11}$ is turned on by a write-0 pulse at terminal 56. Conduction of the transistor $Q_{11}$ turns on a transistor $Q_{12}$ via a transformer $T_7$. A resistor 57 in the emitter circuit of the transistor $Q_{12}$ is selected to provide the necessary negative current for both horizontal wires. Ideally, the negative current through each winding will be $-I_h$ so that the write-0 switch should provide a total current of $-2I_h$. In practice the write-0 current through the selected wire such as the wire $Y_1$ of the first rectangular array, may be adjusted to be a fraction of $-I_h$. However, that fraction may be as little as one-fourth and still prevent a selected core, such as the core 47, from being switched in response to positive current through the wire $C_1D_1$. If the fraction is too small, however, the result will be disturbance of the core.

Unlike the first embodiment, the wires are not terminated by a characteristic impedance to ground but rather by a characteristic impedance for each connected in series with the characteristic impedance of the other, or an impedance 60 equal to twice the characteristic impedance for a given winding connected between the two wires $Y_1$ and $Y_2$. The far end of the wires $Y_1$ and $Y_2$ is connected to ground by an impedance 61 which is equal to the characteristic impedance of the pair of wires in parallel or one-fourth of the impedance 60. Thus, there is no impedance to ground across which a large voltage is applied so that power dissipation in the array is minimized while switching speed is increased 400 percent with only an increase in the drive current NI through its selected core of 50 percent.

We claim:

1. In a coincident-current magnetic core memory, the combination, comprising:

an array of magnetic cores arranged in a matrix having two axes, each core having a B-H hysterisis loop that is approximately rectangular;

a first plurality of wires threading cores along one of said two axes and a second plurality of wires threading cores along the other of said two axes such that a given core may be uniquely addressed by coincident currents through two wires, said plurality of wires being connected to a common junction at one end of said array;

a source of power supply;

first switching means for selectively driving current from said power supply through a given wire along said one axis with an amplitude significantly in excess of half the drive current normally employed to switch cores threaded thereby to a given state;

second switching means connected to said second plurality of wires at the other end of said array for selectively driving coincident current from said power supply in a given wire in a given direction through said given core that is the same direction as the current provided in a wire along said one axis by said first switching means, said current having an amplitude substantially equal to half the drive current normally employed to switch cores threaded thereby to said given state; and means connected to said second plurality of wires at the other end of said array for returning driving current in said given wire to said power supply through all others of said second plurality of wires in parallel, whereby said return current through each of said others of said second plurality of wires reduces the net drive current through cores threaded thereby.

2. The combination as defined in claim 1 including means for selectively reversing the direction of both coincident currents driven by said first and second switching means to selectively switch said one core to a state opposite said given state.

3. The combination as defined in claim 1 including means for selectively reversing the direction of current driven by said second switching means in a wire to selectively switch a core other than said one core.

4. The combination as defined in claim 1 including means for selectively inhibiting said second switching means from driving coincident current in a wire in said given direction, and means connected between said common junction and each of said wires at the other end of said array for driving coincident current through each of said second plurality of wires in a direction opposite said given direction with sufficient amplitude to inhibit all cores threaded by a wire through which said first switching means selectively drives current from being switched to said given state.

5. The combination as defined in claim 1 wherein the number of said second plurality of wires is four and said first switching means drives current through a selected wire with an amplitude equal to substantially four-thirds the half-select current normally employed to switch cores threaded thereby to said given state.

6. The combination as defined in claim 5 wherein said return current means comprises four equal impedances, a separate impedance connected to each of said second plurality of wires at the other end of said array, and said second switching means provides a driving current at a junction between a selected wire and said impedance connected thereto with an amplitude equal to substantially four-thirds the half-select current normally employed to switch cores threaded thereby to said given state.

7. The combination as defined in claim 6 wherein said impedance connected to a given wire is equal to the characteristic impedance of said given wire.

8. The combination as defined in claim 7 including means for selectively reversing the direction of coincident currents driven by said first and second switching means to selectively switch said one core to a state opposite said given state.

9. The combination as defined in claim 8 including means for selectively inhibiting said second switching means from driving coincident current in a wire in said given direction, and a current switch connected to said common junction at the one end of said array for driving current through each of said second plurality of wires in a direction opposite said given direction with sufficient amplitude to inhibit all cores threaded by a wire through which said first switching means selectively drives current from being switched to said given state.

10. The combination as defined in claim 1 wherein the number of said second plurality of wires is two and said first switching means drives current through a selected wire with an amplitude equal to substantially twice the half-select current normally employed to switch cores threaded thereby to said given state.

11. The combination as defined in claim 10 wherein said return current means comprises a transformer having a primary winding connected in series between said second switching means and one of said wires, and a secondary winding connected in series between the other one of said wires and circuit ground, both of said windings being wound the same way such that corresponding ends are connected to respective ones of said wires.

12. The combination as defined in claim 11 including an impedance connected between said two wires at the other end of said array.

13. The combination as defined in claim 12 wherein said impedance is equal to the sum of characteristic impedance of said two wires.

14. The combination as defined in claim 13 including means for selectively reversing the direction of coincident currents driven by said first and second switching means to selectively switch said one core to a state opposite said given state.

15. The combination as defined in claim 14 including means connected between said common junction and each of said wires at the other end of said array for driving coincident current through each of said second plurality of wires in a direction opposite said given direction with sufficient amplitude to inhibit all cores threaded by a wire through which said first switching means selectively drives current from being switched to said given state.

16. The combination as defined in claim 15 wherein said last named means comprises a current switch connected to each of said two wires at the other end of said array by a unidirectional conducting device and at the one end by a unidirectional conducting device connected between said junction and circuit ground.

17. The combination as defined in claim 15 including means for selectively inhibiting said second switching means from driving coincident current in a wire in said given direction.